(12) United States Patent
Logue et al.

(10) Patent No.: US 7,487,354 B2
(45) Date of Patent: Feb. 3, 2009

(54) METHODS AND SYSTEMS FOR USING DIGITAL SIGNATURES IN UNIFORM RESOURCE LOCATORS

(75) Inventors: Jay D. Logue, San Jose, CA (US); John C. Graham, Palo Alto, CA (US)

(73) Assignee: Microsoft Corporation, Redmond, WA (US)

( * ) Notice: Subject to any disclaimer, the term of this patent is extended or adjusted under 35 U.S.C. 154(b) by 608 days.

(21) Appl. No.: 09/861,329

(22) Filed: May 18, 2001

(65) Prior Publication Data

US 2002/0174341 A1    Nov. 21, 2002

(51) Int. Cl.
*H04L 9/00* (2006.01)
(52) U.S. Cl. .................. 713/176; 715/208; 713/162
(58) Field of Classification Search .............. 713/179, 713/162, 168, 176, 181, 201; 709/217, 229, 709/223–225; 726/21, 4; 715/208
See application file for complete search history.

(56) References Cited

U.S. PATENT DOCUMENTS

| | | | | |
|---|---|---|---|---|
| 5,715,314 A | * | 2/1998 | Payne et al. | 705/78 |
| 6,108,703 A | * | 8/2000 | Leighton et al. | 709/226 |
| 6,253,323 B1 | * | 6/2001 | Cox et al. | 713/176 |
| 6,330,575 B1 | * | 12/2001 | Moore et al. | 715/513 |
| 6,662,300 B1 | * | 12/2003 | Peters | 713/182 |
| 6,735,694 B1 | * | 5/2004 | Berstis et al. | 713/178 |
| 2002/0095567 A1 | * | 7/2002 | Royer et al. | 713/150 |

FOREIGN PATENT DOCUMENTS

EP    940960 A1 * 9/1999

* cited by examiner

*Primary Examiner*—Emmanuel L Moise
*Assistant Examiner*—Zachary A Davis
(74) *Attorney, Agent, or Firm*—Workman Nydegger

(57) ABSTRACT

Preparing a document for transmission over a network in a manner that increases the security of URLs included in the document. A server accesses a document that contains a number of URLs. For one or more of those URLs, the server calculates a digital signature that is unique to the intended recipient client, or unique to the user of the client. The server then modifies each of those URLs by including the digital signature in the URL. The document with the modified URLs in then transmitted over the network to the client. Thus, even if a sensitive URL is discovered, that modified URL is unique to the client only or to the user of the client only. Therefore, the damage that may be caused by an unauthorized user is limited to just that client or user.

26 Claims, 5 Drawing Sheets

METHODS AND SYSTEMS FOR USING DIGITAL SIGNATURES IN UNIFORM RESOURCE LOCATORS

BACKGROUND OF THE INVENTION

1. The Field of the Invention

The present invention relates to the field of network communications. More specifically, the present invention relates to improving security and safety before transmitting Uniform Resource Locators (URLs) over a network in which URLs may be used in malevolent ways.

2. The Related Art

There are a wide variety of resources available on networks such as the Internet. For example, e-mail, file transfer, instant messaging, web page, and other services are available on networks. In order to identify a desired network resource, each network resource is associated with a unique identifier called a "Uniform Resource Locator" (URL) or a "Uniform Resource Identifier" (URI) (called collectively herein, "Uniform Resource Locators" or "URLs"). A number of protocols use Uniform Resource Locators such as, for example, HyperText Transport Protocol (HTTP), HyperText Transport Protocol Secure (HTTPS), File Transfer Protocol (FTP), Wireless Application Protocol (WAP), and WebTV Protocol (WTVP) among many others.

Displayable documents are often downloaded over networks. These displayable documents often include markup language that defines the layout and content of the document as displayed. In addition, the markup language typically includes URLs that are associated with a selectable icon that is displayed. Thus, when a user selects the displayed icon, the browser generates a request for the associated URL.

The following is an example of how this association may be established using HyperText Markup Language (HTML):

<a href="maildefault.html">E-mail</a>

In this example, the text string "maildefault.html" is the terminal portion of the URL with the remainder of the URL determined by the context of the tag in the HTML document. The text "E-mail" would be displayed in a fashion that identifies the text string as selectable. For example, the text string "E-mail" may be underlined and/or in a different color. By selecting the string "E-mail", the browser automatically generates a request for the corresponding URL.

By including selectable URLs in displayable documents, network navigation is facilitated. Unfortunately, sometimes, malevolent individuals may discover the URLs in a displayable document. In some cases, those URLs may be used to breach the security of the server computer system that provides the service identified by the URL. For example, a malicious individual may embed the URL in a script language that includes executable instructions requesting that a server perform harmful actions on services identified by the URL. The malicious individual might then transmit the script language back to the server, which may result in the server performing the harmful actions.

Therefore, what are desired are systems, methods, computer program products, and data structures that increase network security when transferring documents containing URLs over a network.

SUMMARY OF THE INVENTION

The present invention extends to methods, systems, computer program products and data structures for transmitting a document over a network in a manner that increases the security of Uniform Resource Locators (URLs) included in the document. In particular, a server accesses a document that contains a number of original URLs. Then, for at least some of those URLs that may be used to cause harm if discovered (also called "sensitive" URLs), the server calculates a digital signature that is unique to the intended recipient client, or unique to the user of the client. The server then modifies each of those URLs by including the digital signature in the URL. The document with the modified URLs is then transmitted over the network to the client.

Then, even if a sensitive URL is discovered by an eavesdropping individual who subsequently embeds the modified URL in script language, that modified URL is unique to the client only or to the user of the client only. Accordingly, the script language is limited to instructing a server to perform harmful actions on the service identified by the modified URL. Since the modified URL is unique to a client, or unique to a user of a client, the harmful action is limited to that particular client or user. In contrast, including the original URL in similar script language without the benefit of the present invention might have resulted in the harmful action being taken on a large number of clients and/or users. Thus, the present invention limits harm that might be caused by a malicious individual discovering and misusing a URL.

Once the user selects a hypertext link associated with a modified URL, the browser generates a request for the service identified by the modified URL. The server that provides the service receives the request that has the modified URL, identifies the requester based on the digital signature, and tailors the service based on the identity of the requester. The server that receives the request for service identified by the modified URL and then deciphers the corresponding digital signature may be the same server as the server that generated the digital signature and the corresponding modified URL in the first place. Alternatively, if the server that receives the request for service is different than the server that generated the digital signature, then the servers are associated such that they share a secret key that allows the server that received the request to decipher the digital signature.

Additional features and advantages of the invention will be set forth in the description, which follows, and in part will be obvious from the description, or may be learned by the practice of the invention. The features and advantages of the invention may be realized and obtained by means of the instruments and combinations particularly pointed out in the appended claims. These and other features of the present invention will become more fully apparent from the following description and appended claims, or may be learned by the practice of the invention as set forth hereinafter.

BRIEF DESCRIPTION OF THE DRAWINGS

In order that the manner in which the above-recited and other advantages and features of the invention are obtained, a more particular description of the invention briefly described above will be rendered by reference to specific embodiments thereof, which are illustrated, in the appended drawings. Understanding that these drawings depict only typical embodiments of the invention and are not therefore to be considered to be limiting of its scope, the invention will be described and explained with additional specificity and detail through the use of the accompanying drawings in which.

DETAILED DESCRIPTION OF THE INVENTION

Figure 1:
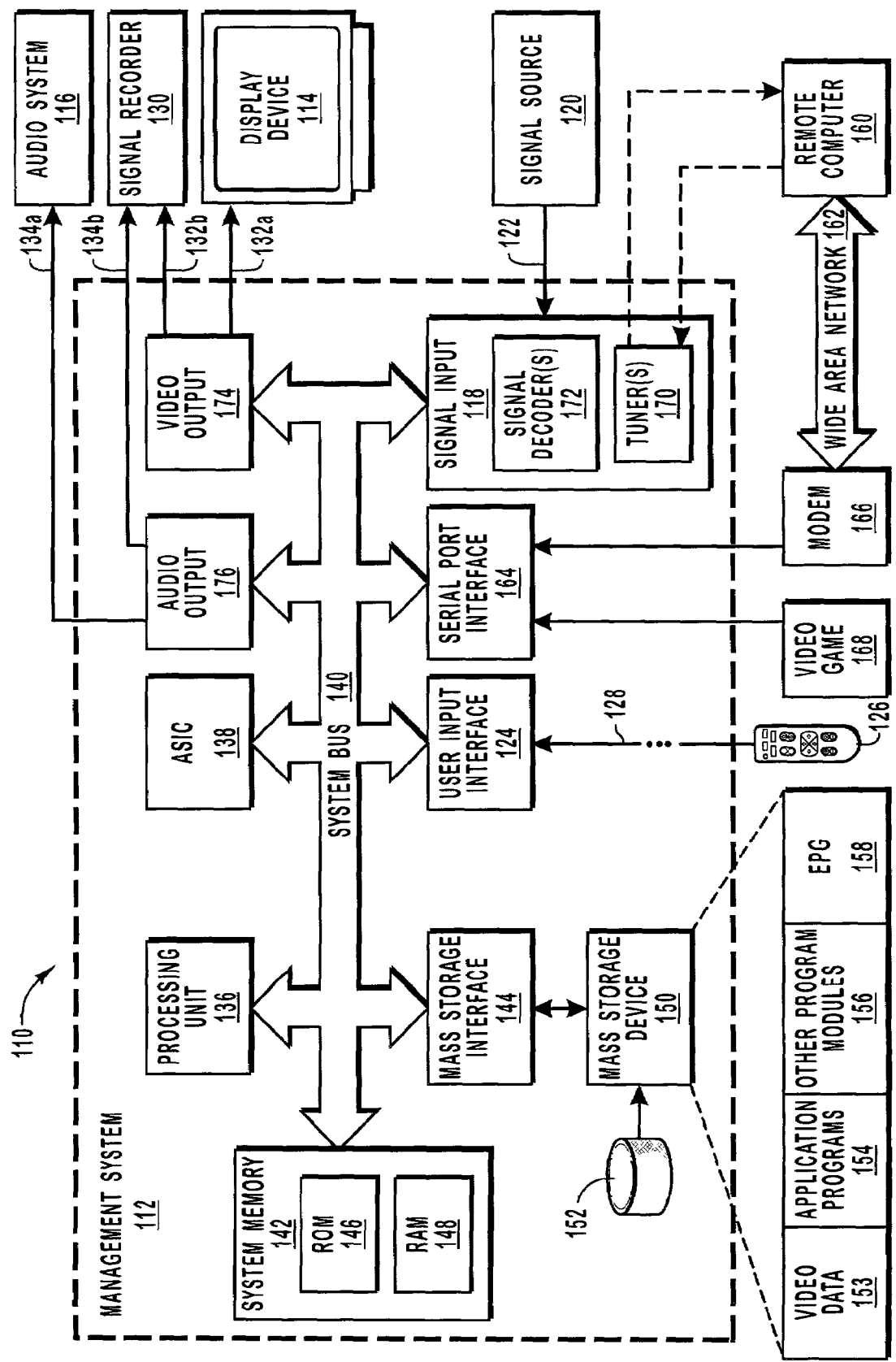
FIG. 1 illustrates an exemplary system that provides a suitable operating environment for the present invention.

In accordance with the present invention, a document is prepared for transmission over a network in a manner that increases the security of Uniform Resource Locators (URLs) included in the document. In particular, a server accesses a document that contains a number of original URLs. Then, for at least some of those URLs that may be used to cause harm if discovered (hereinafter called "sensitive" URLs), the server calculates a digital signature that is unique to the intended recipient client, or unique to the user of the client. These sensitive URLs might be, for example, URLs that allow a malicious individual to do harm by including the sensitive URL in script language that instructs a server to perform harmful actions on the service identified by the URL. The server then modifies each of those URLs by including the digital signature in the URL. The document with the modified URLs is then transmitted over the network to the client. Thus, even if a sensitive URL is discovered, that modified URL is unique to the client or to the user of the client. Therefore, the damage that may be caused by a malicious individual instructing a server to perform harmful actions to the service identified by the modified URL is limited to just that client or user identified by the modified URL.

The embodiments of the present invention may comprise a special purpose or general-purpose processing device or computer including various computer hardware components, as discussed in greater detail below. The embodiments may further comprise multiple computers linked in a networked environment. Set top boxes that enhance the capabilities of conventional televisions represent an example of a special purpose computer.

Embodiments within the scope of the present invention also include computer-readable media for carrying or having computer-executable instructions or data structures stored thereon. Such computer-readable media can be any available media that can be accessed by a general purpose or special purpose computer. By way of example, and not limitation, such computer-readable media can comprise physical storage media such as RAM, ROM, EEPROM, CD-ROM or other optical disk storage, magnetic disk storage or other magnetic storage devices, or any other medium that can be used to carry or store desired program code means in the form of computer-executable instructions or data structures and that can be accessed by a general purpose or special purpose computer.

When information is transferred or provided over a network or another communications connection (either hardwired, wireless, or a combination of hardwired or wireless) to a computer, the computer properly views the connection as a computer-readable medium. Thus, such a connection is also properly termed a computer-readable medium. Combinations of the above should also be included within the scope of computer-readable media. Computer-executable instructions comprise, for example, instructions and data which cause a general purpose computer, special purpose computer, or special purpose processing device to perform a certain function or group of functions.

The invention will be described in the general context of computer-executable instructions, such as program modules, being executed by set-top boxes or other computers. Generally, program modules include routines, programs, objects, components, data structures, etc. that perform particular tasks or implement particular abstract data types. The sequence of instructions implemented in a particular data structure or program module represents examples of corresponding acts for implementing the functions or steps described herein.

FIG. 1 and the corresponding discussion are intended to provide a general description of a suitable environment in which the invention may be implemented. In the discussion, reference is made to a home entertainment system that may be used for displaying and/or recording programming. For purposes of this description and in the claims, a "home entertainment system" may be a display unit, such as a television screen, coupled to a processing device for performing the data processing acts and steps disclosed herein, or may include any number of interconnected consumer electronic devices, one of which having a processing device for performing the data processing disclosed herein.

Examples of such consumer electronic devices include a video cassette recorder ("VCR"), a video game system, a stereo system, a television or monitor with data processing capabilities, a cable television box, a digital satellite system receiver ("DSS"), a digital video broadcasting system ("DVB"), a digital versatile disc system ("DVD"), a compact disk read-only memory system ("CD-ROM"), a set-top box that serves as an Internet terminal, and any other device capable of processing data as described herein. Furthermore, the term "home entertainment system" is to be understood as a term that broadly describes a television-viewing environment, whether it is located in a viewer's home, at a place of business, in the public, or at any other location. Also for purposes of this description and in the claims, the term "programming" includes both the viewable and non-viewable portions of moving image data and its associated sound data.

In one embodiment, the present invention is implemented in a system that uses a conventional television screen or other display unit to display information and includes a WebTV® set-top box or a similar Internet terminal that has been adapted to perform the operations that include composing, sending and receiving email, browsing the World Wide Web ("Web"), accessing other segments of the Internet, and otherwise displaying information. An Internet terminal may use standard telephone lines, Integrated Services Digital Network (ISDN) lines, cable lines associated with cable television service, or the like to connect to the Internet or other wide area networks.

FIG. 1 illustrates a home entertainment system 110 that includes a management system 112, a display device 114 and an audio system 116. Management system 112 may be a set-top box or Internet terminal that has been adapted to perform the operations disclosed herein. Management system 112 may be integrally positioned with or separate from display device 114, which may be a high definition television display, a standard television display, a flat panel display, a projection device, an interface involving direct neural stimulation, a computer monitor, or any other device capable of displaying viewable video image data. Audio system 116 may be a speaker, a stereo system, or any device capable of emitting sound data, and similarly may be integrally positioned with or separate from display device 114.

Management system 112 includes a signal input 118, which receives programming from a signal source 120. The programming is transmitted from signal source 120 to signal input 118 via a programming input line 122, which can be a cable or optic connection, a terrestrial antenna system, a satellite system, or any device or system capable of transmitting programming to home management system 112.

The signal source 120 may be either a single channel signal source or a multiple channel signal source. A single channel signal source provides programming from a recorded medium, such as a videocassette, compact disc, etc. Examples of a single channel signal source include a VCR, a DVD, and the like. Alternatively, a multiple channel signal source includes any system or device that is capable of sending a signal that may be received by a satellite receiver, a cable or optic connection, a terrestrial antenna, or the like. Examples of a multiple channel signal source include DSS/DVB, a cable box, locally broadcast programming (i.e. programming broadcast using UHF or VHF), and the like.

While FIG. 1 illustrates home entertainment system 110 as having a single programming input line 122 and a single signal source 120, there may also be a plurality of programming input lines that transmit programming from a plurality of signal sources. In such embodiments, the home entertainment system may receive the programming from one signal source or from a plurality of signal sources at a time.

Management system 112 also includes a user input interface 124, which receives input from an input device 126, such as a remote control, external special purpose or general-purpose processing device or computer, keyboard, microphone, mouse, or any other device capable of generating electronic instructions for management system 112. Input device 126 is communicatively coupled to management system 112 over an input link 128 so as to enable such control. Input device 126 generates electronic instructions over input link 128 in response to preprogrammed data or in response to a viewer pressing buttons on input device 126. Input device 126 may also control Web browser software within management system 112 as when management system 112 is a set-top box or an Internet terminal that has been adapted to perform the operations disclosed herein. For instance, input device 126 may be programmed to turn on home entertainment system 110 and to tune management system 112 to a channel.

FIG. 1 illustrates a signal recorder 130, which is capable of receiving video and/or audio data and recording the data on a storage medium. Video signals are transmitted to display device 114 and/or signal recorder 130 by video image links 132a and 132b, respectively, examples of which include a radio-frequency ("RF") link, an S-video link, a composite link, or any other equivalent form of video image link. Similarly, audio links 134a and 134b transmit audio data from management system 112 to audio system 116 and/or to signal recorder 130.

The operation of management system 112 is controlled by a central processing unit ("CPU"), illustrated as processing unit 136, which is coupled to an application-specific integrated circuit ("ASIC") 138 via system bus 140 and uses computer-executable instructions implemented in software and/or hardwired logic circuitry. Processing unit 136 and ASIC 138 are also coupled via a system bus 140 to various other system components, including system memory 142, mass storage interface 144, user interface 124 and signal input 118. Processing unit 136 may execute software designed to implement features of management system 112 including features of the present invention.

ASIC 138 contains circuitry that is used to implement certain functions of management system 112. Instructions, data, and other program modules necessary for the operation of processing unit 136 and necessary for the operation of the ASIC 138 may be stored in mass storage device 150 and/or system memory 142, which includes read-only memory ("ROM") 146 and random-access memory ("RAM") 148. System memory 142 is coupled to system bus 140 and mass storage device 150 is coupled to mass storage interface 144, which is in turn also coupled to system bus 140. Thus, ROM 146, RAM 148 and mass storage device 150 are communicatively coupled to ASIC 138 so as to be readable by ASIC 138 and so that data may be written from ASIC 138 to RAM 148 and to mass storage device 150. Mass storage device 150 may be a magnetic hard disk 152, but may also be any of the other computer-readable media referenced above.

Any desired computer-readable instructions or data, including application programs 154, other program modules 156, and an electronic programming guide ("EPG") 158, which specifies the broadcast times and channels of programs can be stored in mass storage device 150.

Mass storage device 150 may also be used to record video data 153, in which case, management system 112 performs the functions of a digital video recorder. Digital video data may be received by home entertainment system 110 from a variety of sources including signal source 120, remote computer 160, video game 168, input device 126 and the Internet.

EPG data may be obtained in a variety of manners. For instance, the EPG data can be supplied to management system 112 by a remote computer 160, such as a server, or from devices on the Internet and stored on mass storage device 150. The EPG data may be supplied on a regular basis to continually maintain a current schedule of programming at the management system 112. Alternatively, the EPG may be delivered to home entertainment system 110 by using a direct-dial communication over standard telephone lines, or by using data transmission over the cable television infrastructure, a satellite network, an over-the-air broadcast or any other available medium, including those previously mentioned.

In the embodiment where management system 112 is associated with the Internet, management system 112 may communicate with remote computer 160 via wide area network ("WAN") 162 using a variety of techniques, including interposing serial port interface 164 between the system bus 140 and a modem 166, using a wireless link, or other means for establishing communications over a WAN that may be internal or external to management system 112. Management device 112 is also capable of transmitting information via the Internet by direct-dial communication over standard telephone lines, or by using any other available communication medium.

While serial port interface 164 may be utilized to connect a modem 166 for communicating across a WAN, serial port interface may also be utilized to connect other consumer electronic devices, such as video game 168, and/or various input devices, such as a keyboard (not shown) or joystick (not shown), to management device 112.

Referring now to signal input 118, if the signal on programming input line 122 includes multiple channels, a tuner 170 included in signal input 118 tunes to a selected channel in the signal. Multiple tuners 170 can be used to provide enhanced viewing features, such as picture-in-picture, recording one channel while viewing another, and recording a plurality of channels simultaneously. A signal decoder 172 may convert video data from an analog format to a digital format, from a digital format to an analog format, or convert between varying digital formats, in the event that ASIC 138 and tuner 170 employ different formats. Video decoder 172 may also decode video data from a compressed video format (e.g.

MPEG). In embodiments where the management system 112 includes multiple tuners 170, management system 112 may also include multiple signal decoders 172 to perform the operations disclosed herein.

Management system 112 may also include video output 174, which may include a video converter that switches between analog and digital formats as necessary when providing video data over video links 132a and 132b. Similarly, audio output 176 can include an audio converter to provide the necessary switching between analog and digital formats across audio links 134a and 134b.

While FIG. 1 and the corresponding discussion above provide a general description of a suitable environment in which the invention may be implemented, it will be appreciated that the features of the present invention disclosed herein may be practiced in association with a variety of different system configurations.

Figure 2:
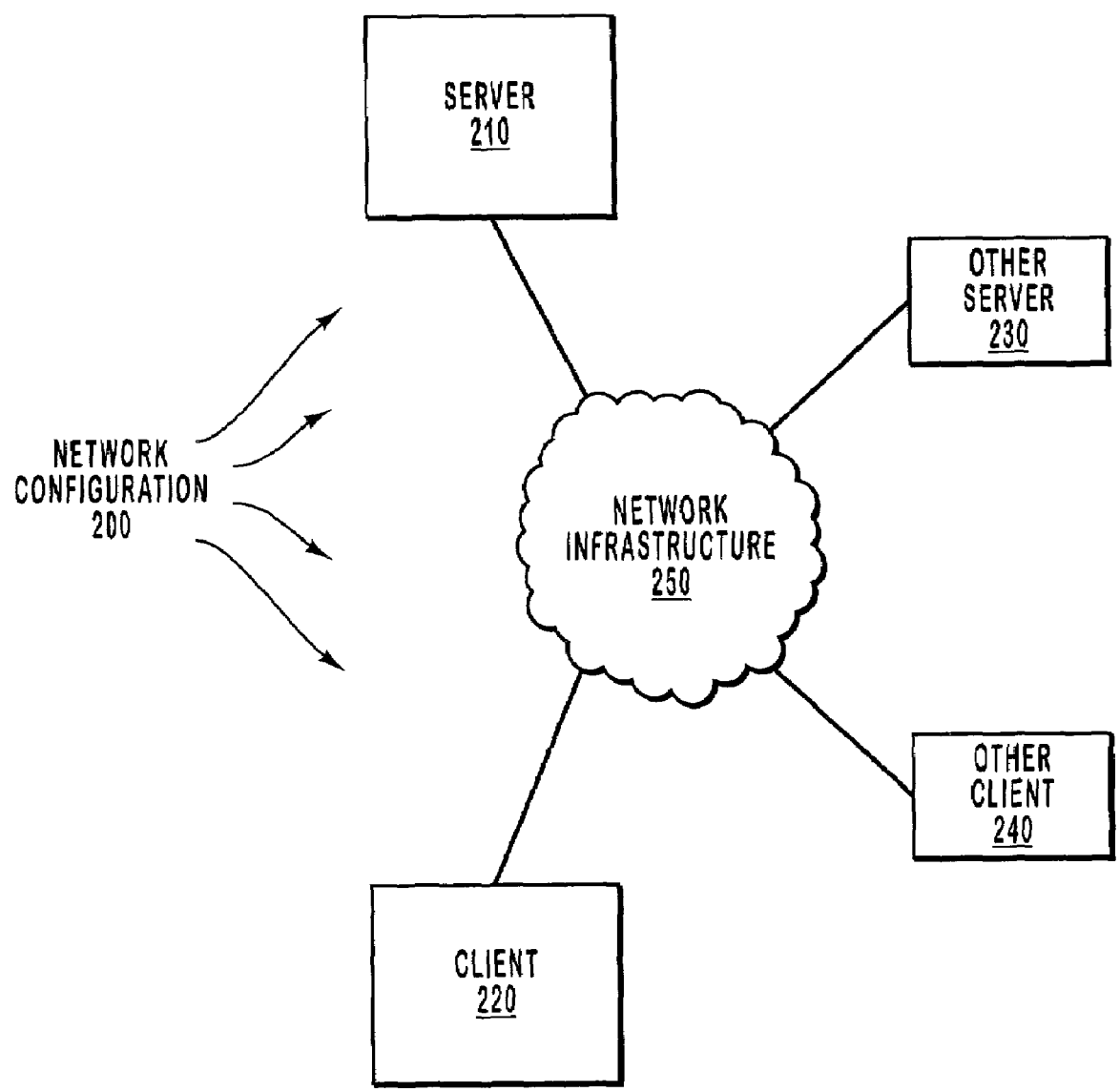
FIG. 2 schematically illustrates a network configuration in which the present invention may operate.

FIG. 2 schematically illustrates a network configuration 200 that includes a server computer system (also called herein, a "server") 210 and a client computer system (also called herein, a "client") 220 as well as potentially other server computer systems such as other server 230 and other client computer systems such as other client 240. The client 220, may include, for example, the home entertainment system 110 described above with respect to FIG. 1, although the present invention is by no means so limited. The servers and clients may be any computing device or combination of computing devices that are capable of implementing the principles of the present invention as claimed herein.

The servers and clients in the network configuration 200 are network connectable through a network infrastructure 250. In this description and in the claims, two entities being "network connectable" means that the entities are either network connected to each other, or they have the ability to be network connected to each other. In this description and in the claims, two entities being "network connected" means that the entities are able to communicate either unidirectionally or bi-directionally through one or more networks. Thus, the network infrastructure 250 may include one or more networks. The network infrastructure 250 may even be the Internet, which spans major portions of the globe.

Typically, network communications have a degree of security that guards against eavesdropping by unintended third parties to a network communication, or the discovery by unintended third parties of sensitive URLs that may be misused. However, despite such security measures, third parties may occasionally eavesdrop on network communications or discover a sensitive URL in another manner. The principles of the present invention improve network security by decreasing the opportunity to cause damage as result of discovering and misusing a sensitive URL. Since the resulting damage is reduced, the motivation to cause damage is also likewise reduced.

Referring to FIG. 2, when server 210 downloads a document intended for a user of a client 220, the other client 230 or another user of the client 220 may discover a sensitive URL and misuse that URL to cause damage to the server that provides the service identified by the URL. The server that provides the service identified by the sensitive URL could either be the server that provided the document that contained the URL (i.e., server 210) or else some other server (e.g., other server 230). Either way, the principles of the present invention reduce the potential for harm caused by misusing a URL.

As part of the communication between the server 210 and the client 220, the server 210 may download displayable pages such as Web pages to the client 220 for display by a browser executing on the client 220. For example, the browser may be one of the application programs 154 mentioned above with respect to FIG. 1.

Figure 3:
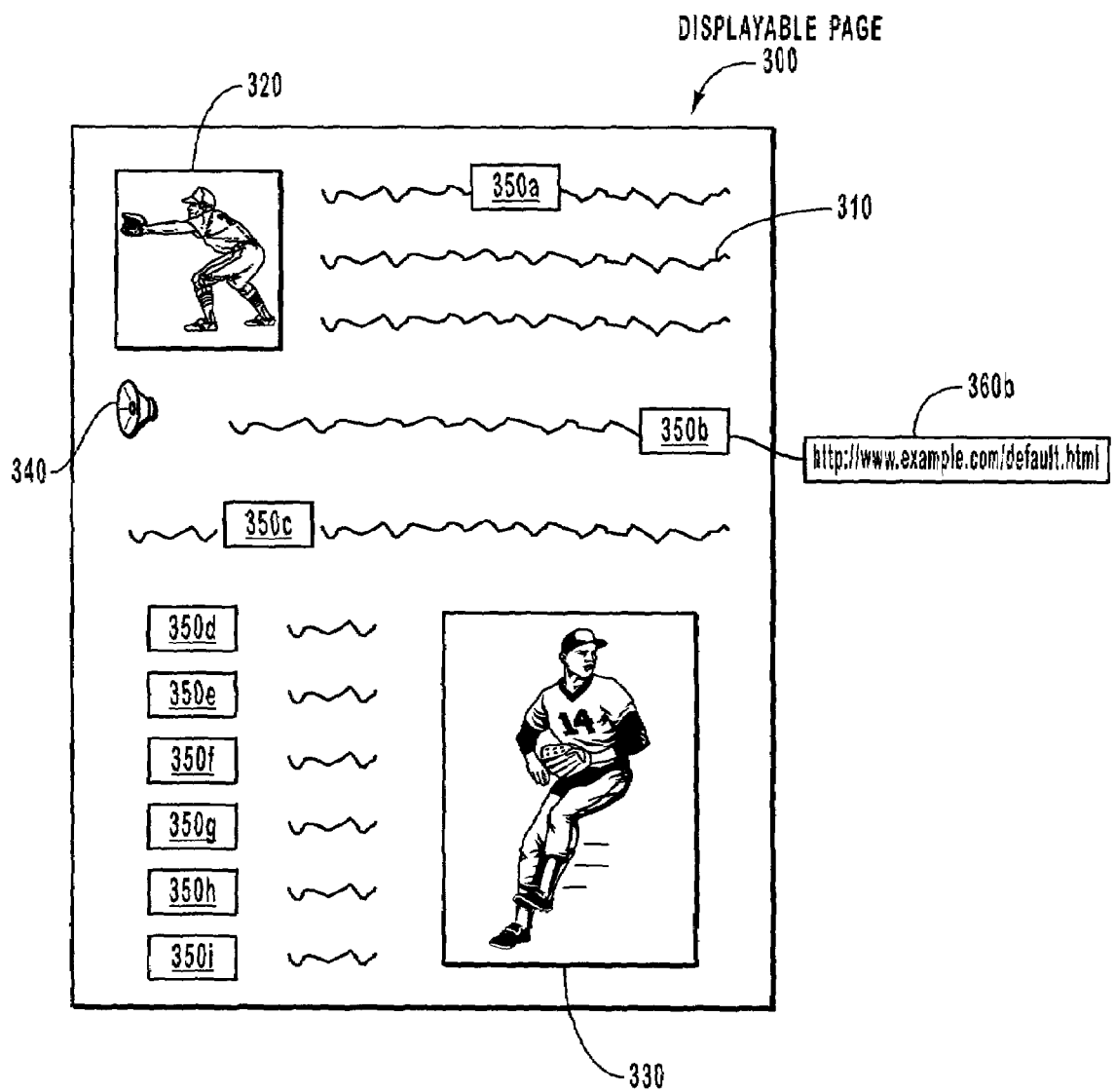
FIG. 3 illustrates the structure of a displayable page that may be communicated from a server to a client.

FIG. 3 illustrates an example of a displayable page 300 that the server 210 may download to the client 220. The displayable page 300 is typically a markup language document, but is illustrated in FIG. 3 as the browser would render the markup language document. The displayable page 300 may include a variety of different data such as, for example, text data 310, image data 320, video data 330, and audio data (represented by the icon 340). In addition, the displayable page 300 includes hypertext links 350 (specifically labeled 350a through 350i) which allow the user to navigate to a service associated with the hypertext link by selecting hypertext links. Each hypertext link is associated with a Uniform Resource Locator or "URL" such that when the user selects the hypertext link, the browser automatically submits a request for the service using the associated URL. The corresponding URL may not necessarily be displayed to the user. The association is defined in the markup language that defines the displayable page 300.

For example, the hypertext link 350b includes a corresponding URL 360b shown as "http://www.example.com/default.html". This URL need not be expressly stated in the markup language in its entirety so long as the browser can identify the URL when a user selects a corresponding hypertext link. For example, the tag that makes the association may only directly indicate that the path "default.com" is associated with the hypertext link 350b. However, from the context of the tag within the corresponding markup language document, the browser may infer that the corresponding prefix and domain name are "http://www.example.com/".

If the user of the other client 240 were to discover a sensitive URL either by eavesdropping on the network communication between the server 210 and the client 220 or in some other fashion, then that user may potentially use the UIRL to sabotage the server 210 or another server (e.g., server 230) associated with the URL. The principles of the present invention restrict the opportunity to cause damage by downloading pages in which the sensitive URLs are unique to the client. Since the URL is specific to the client, the damaged caused by the eavesdropper using the URL is limited to the user identified in the URL, rather than being used to sabotage the server in general.

Figure 4:
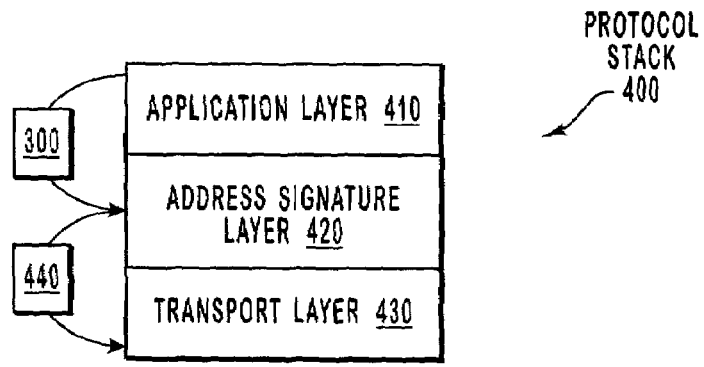
FIG. 4 illustrates a protocol stack that may implement the principles of the present invention.

FIG. 4 illustrates a protocol stack 400 used by the server 210 when communicating with the client 220. The protocol stack 400 includes an application layer 410, an address signature layer 420 and a transport layer 430. The application layer 410 generates or otherwise accesses a displayable document such as displayable document 300. The address signature layer 420 then modifies the displayable document in accordance with a method described below with respect to FIG. 5. The modified displayable document 440 is then passed to the transport layer, which manages the communication of the modified displayable document 440 to the client 220. The configuration of protocol stack illustrated in FIG. 4 is provided for illustrative purposes only. Those skilled in the art will recognize, upon reviewing this description, that there are many software architectures that may be used to perform the method of FIG. 5.

Figure 5:
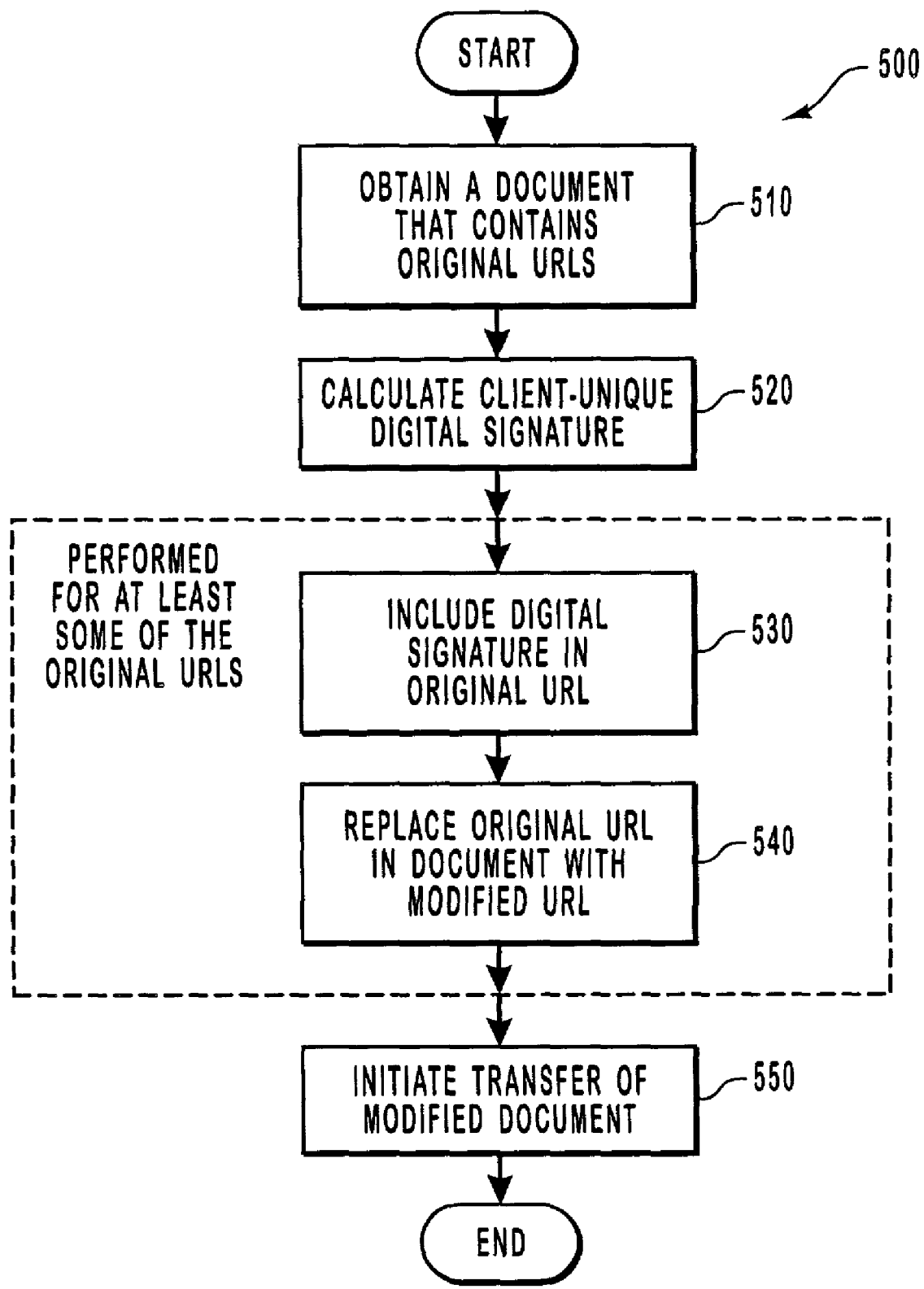
FIG. 5 illustrates a method of modifying at least some of the URLs in the displayable document so as to increase the security of URLs contained with the document.

FIG. 5 illustrates a flowchart of a method 500 of the server dispatching a displayable document to the client in a manner that increases the security of one or more of the URLs in the document even if the document is intercepted during transmission.

First, the server obtains the displayable document that contains "original" URLs (act 510). The term "original" URLs is used to distinguish the initial state of the URLs from their state when modified as described below. Then, a digital signature is calculated, the digital signature being unique to the client 220 or unique to a user of the client 220 (act 520). Then for at least some of the original URLs, the following acts 530 and 540 are performed.

Specifically, the digital signature is included in the original URL to modify the original URL (act 530). Next, the original URL in the displayable document is replaced with the modified URL in the document (act 540). This is repeated for at least some of the original URLs. The only requirement of the original URLs that are to be modified is that the corresponding protocol that defines the format of the original URLs be flexible enough to permit information such as a digital signature to be included in the URL. In this description and in the claims, such protocols are termed "URL flexible" protocols. Currently, such protocols include, for example, HyperText Transport Protocol (HTTP), HyperText Transport Protocol Secure (HTTPS), Wireless Application Protocol (WAP), and WebTV Protocol (WTVP). However, this is not an exhaustive list. The present invention may work with any URL flexible protocols whether now defined or whether they are developed in the future.

The document with the modified URLs is then transferred to the client (act 550). If an individual were to access the modified document, the original sensitive URLs are replaced with the modified URLs that are unique to a particular client or user. Thus, the damage that may result from misusing the URL is limited to that particular client or user. For example, a malicious individual might embed the modified URL into script language that instructs a server to perform harmful acts on the service identified by the URL, and then transmit the script language to the server. However, since the URL is limited to a particular client or user, the service that may be harmed by the script language is also limited to the particular client or user.

Figure 6:
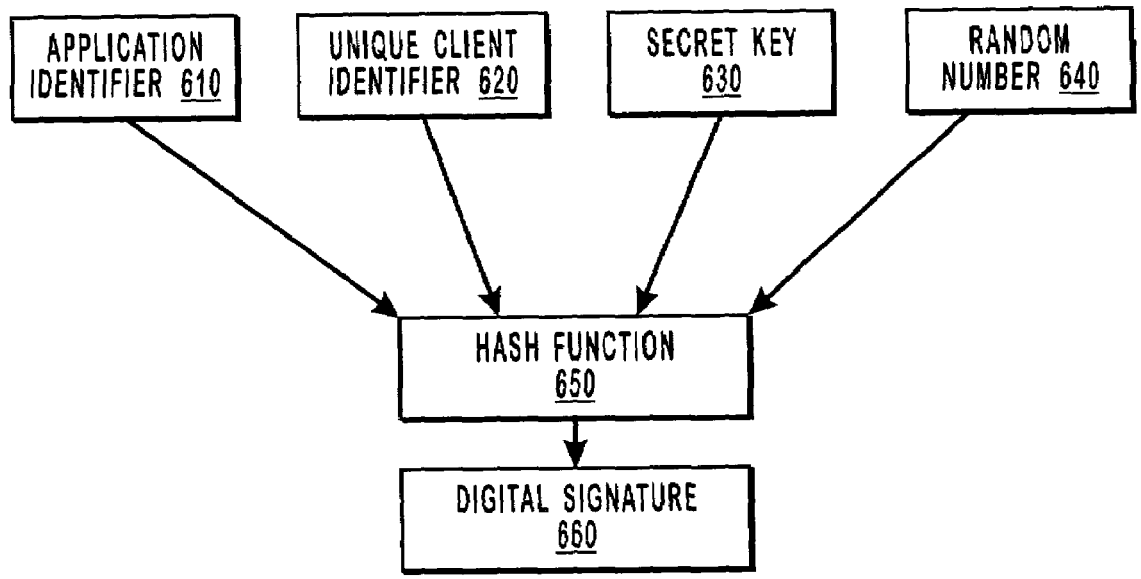
FIG. 6 illustrates an example data flow that may be involved with the calculation of a digital signature that is to be inserted into a URL.

FIG. 6 functionally illustrates the data flow involved with the act of calculating the digital signature. An application identifier 610 such as a host or domain name path, a unique client identifier 620 such as a serial number associated with the client 220 or a user ID associated with its user, a secret key 630 that is known to the server 210 and the client 220, and a random number 640 are input into a hashing function 650 such as the MD5 hashing algorithm to generate the digital signature 660. The MD5 hash algorithm generates hash values of arbitrary length. In one example, the digital signature is 16 bytes, each byte represented by two characters. Thus, the digital signature may be 32 characters long.

Figure 7:
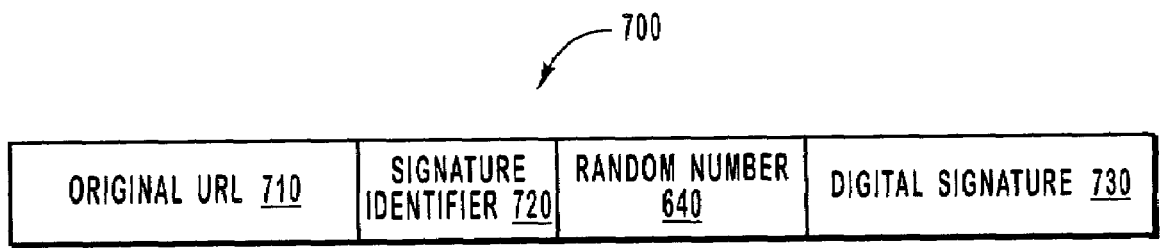
FIG. 7 illustrates a data structure of a modified URL in accordance with the present invention.

FIG. 7 illustrates a possible data structure 700 of a modified URL. The data structure includes the original URL 710 and a digital signature 730. The data structure also potentially includes a signature identifier 720 that identifies that the URL is modified to contain a signature, as well as the random number 640 to aid in the decryption process of the digital signature. Although the signature identifier 720, the random number 640, and the digital signature 730 are illustrates as being simply appended to the end of the original URL 710, these fields may be inserted anywhere in the original URL 710 so long as the inserted location is permitted by the governing protocol. In one example, the signature identifier 720 also specifies the location of the digital signature 730.

Once the user selects a hypertext link associated with a modified URL, the browser generates a request for the service identified by the modified URL. The server that provides the service receives the request that has the modified URL, identifies the requestor based on the digital signature, and tailors the service based on the identity of the requestor. The server that generated the digital signature, added the digital signature to the URL to form a modified URL, inserted the modified URL back into the document, and then downloaded the modified document to the user may be the same server that deciphers the digital signature and then provides the service identified by the selected URL. However, the server that generated the digital signature may also be a different server. In this latter case, the server that generated the digital signature is associated with the server that deciphers the digital signature so as to share a secret key that allows for the generation and deciphering of the digital signature.

By tailoring the service to the client or user identified by the digital signature, the modified URL represents services specific to the client or user identified by the digital signature included in the URL. Accordingly, script language that embeds the modified URL causes harm only to the client or user. Damage to the server as a whole is avoided.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes, which come within the meaning and range of equivalency of the claims, are to be embraced within their scope.

What is claimed and desired secured by United States Letters Patent is:

1. In a network system that includes a server computer system and a client computer system, wherein the server computer system is capable of transmitting a document that contains Uniform Resource Locators (URLs) to the client computer system, a method of the server computer system dispatching the document to the client computer system in a manner that increases the security of one or more of the Uniform Resource Locators in the document even if the document is intercepted during transmission, the method comprising the following:

a) obtaining a document that contains original URLs;
   b) calculating a digital signature that is unique to the client computer system or unique to a user of the client computer system, wherein at least a portion of the digital signature is generated using a hash function that receives as input at least a unique client identifier for the client computer system to which the document is to be dispatched and a secret key known to the server computer system and to the client computer system;
   c) for at least one of the original URLs, performing the following:
      i) including the digital signature in the original URL to modify the original URL; and
      ii) replacing the original URL in the document with the modified URL; and
   d) initiating the transfer of the document with the modified URLs to the client computer system.

2. A method in accordance with claim 1, wherein the original URLs are in conformance with the HyperText Transport Protocol (HTTP).

3. A method in accordance with claim 1, wherein the original URLs are in conformance with the HyperText Transport Protocol Secure (HTTPS) protocol.

4. A method in accordance with claim 1, wherein the original URLs are in conformance with the Wireless Application Protocol (WAP).

5. A method in accordance with claim 1, wherein at least one of the original URLs in the document is associated with services offered by the server computer system.

6. A method in accordance with claim 1, wherein at least one of the original URLs in the document is associated with services offered by other server computer systems in the network system.

7. A method in accordance with claim 1, further comprising the following:
receiving a request for service that includes one of the modified URLs;
identifying a requestor based on the digital signature included in the modified URL; and
tailoring the service based on the identification of the requestor.

8. A method in accordance with claim 1, further comprising the following:
determining which of the original URLs are to be modified.

9. A method in accordance with claim 1, wherein including the digital signature further comprises the following:
including an identifier in the original URL to modify the original URL, wherein the identifier represents that the digital signature is contained in the modified URL.

10. A method in accordance with claim 1, wherein including the digital signature further comprises the following:
including an identifier in the original URL to modify the original URL, wherein the identifier represents the location of the digital signature in the modified URL.

11. A method in accordance with claim 1, wherein including the digital signature further comprises the following:
including a random bit sequence in the original URL to modify the original URL.

12. A method in accordance with claim 1, wherein the hash function comprises the MD5 hash algorithm.

13. A method in accordance with claim 1 wherein the hash function also receives as input an application name.

14. A method in accordance with claim 1, wherein the unique client identifier comprises a serial number associated with the client computer system.

15. A method in accordance with claim 1, wherein the hash function also receives as input a secret key.

16. A computer program product for use in a network system that includes a server computer system and a client computer system, wherein the server computer system is capable of transmitting a document that contains Uniform Resource Locators (URLs) to the client computer system, the computer program product for implementing a method of the server computer system dispatching the document to the client computer system in a manner that increases the security of one or more of the Uniform Resource Locators in the document even if the document is intercepted during transmission, the computer program product comprising computer-readable media having stored thereon computer-executable instructions for performing the following:
a) causing a document that contains original URLs to be accessed;
b) calculating a digital signature that is unique to the client computer system or unique to a user of the client computer system, wherein at least a portion of the digital signature is generated using a hash function that receives as input at least a unique client identifier for the client computer system to which the document is to be dispatched and a secret key known to the server computer system and to the client computer system;
c) for at least one of the original URLs, performing the following:
i) including the digital signature in the original URL to modify the original URL; and
ii) replacing the original URL in the document with the modified URL; and
d) causing the document to be transferred with the modified URLs to the client computer system.

17. A computer program product in accordance with claim 16, wherein the computer-readable media further includes thereon computer-executable instructions for performing the following:
detecting the receipt of a request for service that includes one of the modified URLs;
identifying a requestor based on the digital signature included in the modified URL; and
tailoring the service based on the identification of the requestor.

18. A computer program product in accordance with claim 16, wherein the computer-readable media further includes thereon computer-executable instructions for performing the following:
determining which of the original URLs are to be modified.

19. A computer program product in accordance with claim 16, wherein the computer-readable media further includes thereon computer-executable instructions for performing the following:
including an identifier in the original URL to modify the original URL, wherein the identifier represents that the digital signature is contained in the modified URL.

20. A computer program product in accordance with claim 16, wherein the computer-executable instructions for including the digital signature further comprise computer-executable instructions for performing the following:
including an identifier in the original URL to modify the original URL, wherein the identifier represents the location of the digital signature in the modified URL.

21. A computer program product in accordance with claim 16, wherein the computer-executable instructions for including the digital signature further comprise computer-executable instructions for performing the following:
including a random bit sequence in the original URL to modify the original URL.

22. A computer program product in accordance with claim 16, wherein the hash function comprises the MD5 hash algorithm.

23. A computer program product in accordance with claim 16, wherein the hash function also receives as input.

24. A computer program product in accordance with claim 16, wherein the hash function also receives as input a serial number associated with the client computer system.

25. A computer program product in accordance with claim 16, wherein the hash function also receives as input a secret key.

26. A server computer system in a network system that includes the server computer system and a client computer system, wherein the server computer system is capable of transmitting a document that contains Uniform Resource Locators (URLs) to the client computer system, the server computer system enabled to dispatch the document to the client computer system in a manner that increases the security of one or more of the Uniform Resource Locators in the document even if the document is intercepted during transmission, the server system comprising at least one computer processor and at least one computer-readable medium, the at least one computer-readable medium having stored thereon computer-executable instructions that, when executed, cause the at least one processor to perform the following:
a) obtaining a document that contains original URLs;
b) calculating a digital signature that is unique to the client computer system or unique to a user of the client computer system, wherein at least a portion of the digital signature is generated using a hash function that receives as input at least a unique client identifier for the client computer system to which the document is to be dispatched and a secret key known to the server computer system and to the client computer system;
c) for at least one of the original URLs, performing the following:
  i) including the digital signature with the original URL to generate a modified URL; and
  ii) replacing the original URL in the document with the modified URL; and
d) initiating the transfer of the document with the modified URLs to the client computer system.

* * * * *